United States Patent
Van Der Velde

(10) Patent No.: US 12,015,929 B2
(45) Date of Patent: Jun. 18, 2024

(54) MINIMISATION OF DRIVE TEST IN A TELECOMMUNICATION NETWORK

(71) Applicant: Samsung Electronics Co., Ltd., Suwon-si (KR)

(72) Inventor: Himke Van Der Velde, Staines (GB)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/682,211

(22) Filed: Feb. 28, 2022

(65) Prior Publication Data

US 2022/0191705 A1  Jun. 16, 2022

Related U.S. Application Data

(63) Continuation of application No. 16/918,694, filed on Jul. 1, 2020, now Pat. No. 11,265,729.

(30) Foreign Application Priority Data

Jul. 1, 2019 (GB) .................................... 1909462
Jun. 26, 2020 (GB) .................................... 2009789

(51) Int. Cl.
*H04W 16/18* (2009.01)
*H04W 16/10* (2009.01)
(Continued)

(52) U.S. Cl.
CPC ........... *H04W 16/14* (2013.01); *H04W 16/10* (2013.01); *H04W 16/18* (2013.01); *H04W 24/02* (2013.01);
(Continued)

(58) Field of Classification Search
CPC ..... H04W 16/14; H04W 24/02; H04W 16/18; H04W 48/06; H04W 36/0069;
(Continued)

(56) References Cited

U.S. PATENT DOCUMENTS 9,264,954 B2    2/2016  Radulescu et al.
2008/0176554 A1  7/2008  Gibbons et al.
(Continued)

FOREIGN PATENT DOCUMENTS

EP   2552149 A2   1/2013
EP   3 285 517 A1  2/2018
(Continued)

OTHER PUBLICATIONS

Extended European Search Report dated Jul. 1, 2022, issued in a counterpart European Application No. 20834569.4.
(Continued)

*Primary Examiner* — Hassan A Phillips
*Assistant Examiner* — Prenell P Jones
(74) *Attorney, Agent, or Firm* — Jefferson IP Law, LLP

(57) ABSTRACT

A communication method and a system for converging a 5th-Generation (5G) communication system or networks beyond 5G communication system for supporting higher data rates beyond a 4th-Generation (4G) system with a technology for internet of things (IoT) are provided. The disclosure may be applied to intelligent services based on the 5G communication technology and the IoT-related technology, such as a smart home, a smart building, a smart city, a smart car, a connected car, health care, digital education, a smart retail, security and safety services. A method of performing minimisation of drive tests (MDT), in a mobile telecommunication network is provided. The method includes providing an MDT measurement relating to a result of an early measurement, wherein the early measurement is a measurement performed in an idle state or an inactive state, and wherein the mobile telecommunication network configures a user equipment (UE) to report to the mobile telecommunication network upon transition to a connected state.

20 Claims, 16 Drawing Sheets

(51) Int. Cl.
- *H04W 16/14* (2009.01)
- *H04W 24/02* (2009.01)
- *H04W 36/00* (2009.01)
- *H04W 48/06* (2009.01)
- *H04W 48/16* (2009.01)
- *H04W 72/0453* (2023.01)

(52) U.S. Cl.
CPC ....... *H04W 36/0069* (2018.08); *H04W 48/06* (2013.01); *H04W 48/16* (2013.01); *H04W 72/0453* (2013.01)

(58) Field of Classification Search
CPC . H04W 16/10; H04W 72/0453; H04W 48/16; H04W 24/00; H04W 24/10; H04B 17/003; H04L 43/50; H04L 43/08
See application file for complete search history.

(56) References Cited

U.S. PATENT DOCUMENTS

| | | |
|---|---|---|
| 2012/0236805 A1 | 9/2012 | Kuo et al. |
| 2012/0252487 A1 | 10/2012 | Siomina et al. |
| 2013/0010631 A1 | 1/2013 | Jung et al. |
| 2013/0308481 A1 | 11/2013 | Kazmi et al. |
| 2014/0119224 A1 | 5/2014 | Keskitalo et al. |
| 2014/0126472 A1 | 5/2014 | Siomina et al. |
| 2014/0153482 A1 | 6/2014 | Schmidt et al. |
| 2014/0241250 A1* | 8/2014 | Jung ............ H04W 48/16 370/328 |
| 2014/0293818 A1 | 10/2014 | Sesia et al. |
| 2015/0044973 A1 | 2/2015 | Siomina |
| 2015/0065106 A1 | 3/2015 | Catovic et al. |
| 2015/0141040 A1 | 5/2015 | Jung et al. |
| 2015/0201339 A1 | 7/2015 | Yi et al. |
| 2015/0373507 A1* | 12/2015 | Jung ............ H04W 24/08 370/235 |
| 2016/0344489 A1 | 11/2016 | Kim et al. |
| 2017/0208491 A1 | 7/2017 | Xu et al. |
| 2017/0303153 A1 | 10/2017 | Siomina et al. |
| 2018/0124648 A1 | 5/2018 | Park et al. |
| 2018/0242181 A1 | 8/2018 | Tsutsui |
| 2019/0082489 A1 | 3/2019 | Fujishiro et al. |
| 2019/0141554 A1 | 5/2019 | Siomina et al. |
| 2019/0182889 A1 | 6/2019 | Fujishiro et al. |
| 2020/0078909 A1 | 3/2020 | Park et al. |
| 2020/0120482 A1 | 4/2020 | Parkvall et al. |
| 2020/0162949 A1 | 5/2020 | He et al. |
| 2020/0314667 A1 | 10/2020 | Fujishiro et al. |
| 2020/0351693 A1 | 11/2020 | Jung et al. |
| 2020/0404521 A1* | 12/2020 | Kim ............ H04W 24/08 |
| 2021/0006981 A1* | 1/2021 | Van Der Velde ............ H04W 72/0453 |
| 2021/0235295 A1 | 7/2021 | Futaki et al. |
| 2021/0235300 A1* | 7/2021 | Teyeb ............ H04W 24/10 |
| 2021/0345144 A1* | 11/2021 | Yang ............ H04W 76/30 |
| 2021/0360449 A1 | 11/2021 | Kim et al. |
| 2022/0046456 A1* | 2/2022 | Kumar ............ H04W 24/10 |
| 2022/0095181 A1* | 3/2022 | Parichehrehteroujeni ............ H04W 36/0072 |
| 2022/0191705 A1* | 6/2022 | Van Der Velde ..... H04W 16/18 |
| 2023/0057408 A1* | 2/2023 | Ramachandra ....... H04W 24/10 |
| 2023/0071803 A1* | 3/2023 | Liu ............ H04W 24/08 |
| 2023/0090309 A1* | 3/2023 | Kazmi ............ H04W 24/02 |
| 2023/0180223 A1* | 6/2023 | Tseng ............ H04W 74/0833 370/329 |

FOREIGN PATENT DOCUMENTS

| | | |
|---|---|---|
| EP | 3846527 A1 | 7/2021 |
| EP | 3 915 294 A1 | 12/2021 |
| EP | 3 915 295 A1 | 12/2021 |
| WO | 2016/012053 A1 | 1/2016 |

OTHER PUBLICATIONS

Spreadtrum Communications, Logged MDT Issues in MR-DC, 3GPP R2-1905676, TSG-RAN WG2 Meeting #106, Reno, USA, Apr. 30, 2019, sections 2.1-2.2; and figure 1.
Ericsson, Location Information Report in MDT, R2-1906871, 3GPP Tsg-Ran WG2 Meeting #106, Reno, USA, May 2, 2019, section 2.1.
Samsung, On Supporting MDT in EN-DC, R2-1907777, 3GPP TSG-RAN WG2 Meeting #106, Reno, USA, May 3, 2019, section 2.
Kyocera, MDT considerations for NG-RAN, R2-1906657, 3GPP TSG-RAN WG2 Meeting #106, Reno, USA, May 2, 2019, section 2.
International Search Report dated Nov. 24, 2020, issued in International Application No. PCT/KR2020/008575.
Great Britain Office Action dated Feb. 25, 2021, issued in a counterpart GB Application No. GB2009789.5.
Great Britain Office Action dated Nov. 18, 2021, issued in a counterpart GB Application No. GB2009789.5.
Great Britain Office Action dated Oct. 20, 2022, issued in the United Kingdom (UKIPO) Application No. 2009789.5.
British Search and Examination Report dated Apr. 24, 2023, issued in British Patent Application No. GB2303991.0.

* cited by examiner

MINIMISATION OF DRIVE TEST IN A TELECOMMUNICATION NETWORK

CROSS-REFERENCE TO RELATED APPLICATION(S)

This application is a continuation application of prior U.S. application Ser. No. 16/918,694, filed on Jul. 1, 2020, which will be issued as U.S. Pat. No. 11,265,729 on Mar. 1, 2022, which is based on and claimed priority under 35 U.S.C. § 119(a) of a United Kingdom Patent Application number 1909462.2, filed on Jul. 1, 2019, in the United Kingdom Intellectual Property Office, and of a United Kingdom patent application number 2009789.5, filed on Jun. 26, 2020, in the United Kingdom Intellectual Property Office, the disclosure of each of which is incorporated by reference herein in its entirety.

BACKGROUND

1. Field

The disclosure relates to a provision of minimisation of drive test (MDT) with early measurements. More particularly, the disclosure relates to 5th generation (5G) or New Radio (NR) systems, and to networks beyond 5G and other systems and devices can benefit.

2. Description of Related Art

To meet the demand for wireless data traffic having increased since deployment of 4th generation (4G) communication systems, efforts have been made to develop an improved 5G or pre-5G communication system. Therefore, the 5G or pre-5G communication system is also called a 'Beyond 4G Network' or a 'Post long-term evolution (LTE) System'.

The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency-shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Wireless networks, in which a user equipment (UE), such as a mobile handset communicates via wireless links to a network of base stations or other wireless access points connected to a telecommunications network, have undergone rapid development through a number of generations of radio access technology. The initial deployment of systems using analogue modulation has been superseded by $2^{nd}$ generation (2G) digital systems, such as global system for mobile communications (GSM), typically using GSM enhanced data rates for GSM evolution radio access (GERA) radio access technology, and these systems have themselves been replaced by or augmented by $3^{rd}$ generation (3G) digital systems, such as universal mobile telecommunications system (UMTS), using the universal terrestrial radio access (UTRA) radio access technology. Third generation standards provide for a greater throughput of data than is provided by second generation systems; this trend is continued with the proposals by the 3rd generation partnership project (3GPP) of the long-term evolution (LTE) system, using evolved UTRA (E-UTRA) radio access technology, which offers potentially greater capacity and additional features compared with the previous standards. WiMax systems using radio access technology to IEEE 802.16 also offer improvements over previous standards.

Wireless networks typically require measurement data to be gathered, for functions, such as mobility management (e.g., handover) and radio resource management (e.g., which resources to allocate to a UE). Measurements are available to support self-optimization of networks (SON) as well as to verify if the network is deployed well e.g., proper coverage (thereby minimising the need for so-called drive tests). More particularly, it is beneficial to know the strength of signals received form wireless nodes, such as base stations as a function of location. This information may be used to deduce the location of coverage holes in the network, such as due to shadowing by buildings, to detect areas of weak coverage, or areas of overshoot coverage, where coverage from a cell of the wireless network extends beyond what was planned.

Measurement data may also be used to detect interference, such as interference between pilot signals from different cells, and to deduce coverage areas for uplink signals. Coverage mapping, of areas with strong as well as weak signals, may depend on measurement data.

Measurement data may be gathered by drive testing, in which vehicles equipped with suitable measurement equipment traverse the area of coverage of a wireless network. However, this may be expensive and inconvenient, as well as contributing to carbon dioxide pollution. Accordingly, user equipment may be used gather measurement data, as the users go about their leisure or business activities within the wireless network. User equipment may be used to gather measurement data, and to store the data to be uploaded to the wireless network. Such measurement data, collected by the UEs themselves, is referred to as minimisation of drive test (MDT) data.

5th Generation (5G) operational standards are currently being exploited and further enhanced. Various configurations are possible in 5G that pose new issues in connection with MDT. Therefore it needs to be provided a method for enhancing MDT measurements and solving issues related to the MDT measurements in a dual connectivity situation.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of performing minimisation of drive tests (MDT), in a mobile telecommunication network is provided. The method includes providing an MDT measurement relating to a result of an early measurement, wherein the early measurement is a measurement performed in an idle state or an inactive state, and wherein the mobile telecommunication network configures a user equipment (UE) to report to the mobile telecommunication network upon transition to a connected state.

Additional aspects will be set forth in part in the description which follows and, in part, will be apparent from the description, or may be learned by practice of the presented embodiments.

In accordance with an aspect of the disclosure, a method of performing minimisation of drive tests (MDT) in a mobile telecommunication network is provided. The method includes the step of a user equipment (UE) providing an MDT measurement relating to a result of an early measurement, wherein the early measurement is a measurement performed in an idle state or an inactive state, and wherein the mobile telecommunication network configures the UE to report to the mobile telecommunication network upon transition to a connected state.

In an embodiment of the disclosure, the UE reports the MDT measurement to the mobile telecommunication network upon transition to a connected state, whereby the MDT measurement reporting comprises reporting of the early measurement result with the further operation of providing location information, associated with the location of the UE at the time the measurement was taken.

In an embodiment of the disclosure, the UE in an idle state or an inactive state logs a measurement result for MDT and reports availability of the logged MDT measurement result to the mobile telecommunication network, wherein the mobile telecommunication network subsequently retrieves the result upon transition to a connected state, whereby the logged MDT measurements can include the early measurement result.

In an embodiment of the disclosure, the UE handles, within logged MDT measurements, the early measurement result separately from any other result.

In accordance with another aspect of the disclosure, a method of operating a mobile telecommunication network, wherein the network implements dual connectivity (DC), or carrier aggregation (CA), whereby a UE may be configured to be in communication with a master node (MN), and a secondary node (SN), whereby one or more of the MN and the SN configures immediate MDT (iMDT) is provided.

In an embodiment of the disclosure, the MN and the SN interact to ensure limitations in UE measurement capabilities are respected when a measurement for MDT is configured, whereby the interaction comprises co-ordinating the measurement each of the MN and SN can configure, and comprises one or more of a) a renegotiation process whereby the SN requests more resource for regular radio resources management (RRM) measurements not performed solely for MDT purposes, b) a renegotiation process whereby the SN request more resource and indicates its purpose, and c) the provision of separate coordination fields for immediate MDT.

In accordance with another aspect of the disclosure, a method of operating a mobile telecommunication network, wherein the network implements DC, or CA, whereby a UE is configurable to be in communication with a MN, and a SN, whereby the SN configures one or more of eMeas and logged MDT is provided.

In an embodiment of the disclosure, the SN configures eMeas for the UE and wherein the MN has limited or no knowledge of frequencies controlled by the SN.

In an embodiment of the disclosure, the configuration includes one or more specific parameters required by the UE in order to measure a frequency.

In an embodiment of the disclosure, the configuration includes details regarding reference symbols.

In an embodiment of the disclosure, the operation of setting configuration parameters for the UE comprises one or more of a) each of the MN and SN determining certain parameters and setting a value thereto alone, b) the MN and SN interacting to ensure that certain limitations in UE measurement capabilities are accounted for, and c) certain parameters being set by either the MN or SN with little or no coordination therebetween.

Aspects of the disclosure relate to the provision of MDT with early measurements. This relates to adapted forms of both logged and immediate MDT. More particularly, the provision of detailed location information is described.

Further, aspects of the disclosure relate to features related to the internode operation in a Dual Connectivity or Carrier Aggregation network configuration. There is an issue concerning possible conflict between the responsibilities of the MN and the SN and embodiments of the address these issues.

According to the disclosure, it is possible to enhance of MDT measurements and an internode operation in 5G communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
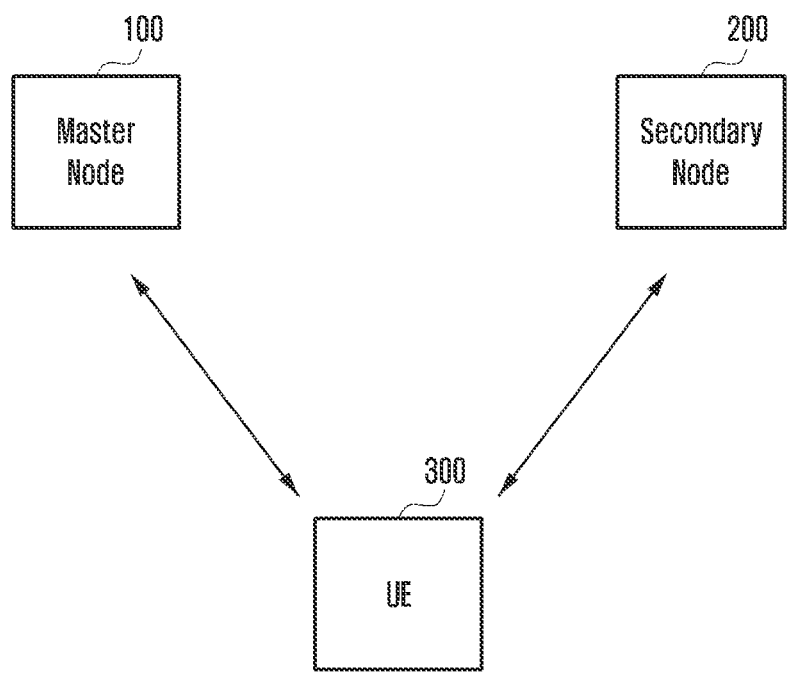
FIG. 1 illustrates a general network setup according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, a term to identify an access node, a term to denote network entities, a term to denote messages, a term to denote an interface between network entities, and a term to denote a variety of types of identity information have been illustrated for convenience of description. Accordingly, the disclosure is not limited to the following terms, and other terms to denote targets having equivalent technical meanings may be used.

For convenience of description, in the disclosure, terms and names defined in long term evolution (LTE) of a 3rd generation partnership project (hereinafter referred to as "3GPP"), new radio (NR) standards are used. However, the disclosure is not restricted by the terms and names, and may be identically applied to systems complying with other standards.

First, terms used in this specification are defined.

In this specification, a radio bearer may include a data radio bearer (DRB) and a signaling radio bearer (SRB).

For example, a data radio bearer (DRB) provided in a radio interface between a terminal and a base station is a path through which the data of a user plane is forwarded. A signaling radio bearer (SRB) may be a path through which the data of a control plane, such a radio resource control (RRC) layer and non-access-stratum (NAS) control message, is forwarded.

In this specification, a wireless communication system supported in a network over which a plurality of communication systems interwork may support interworking between heterogeneous technologies frequency bands (multi-RAT interworking).

For example, the radio access technology may be a new radio access network (new RAN) supporting all of a 4G radio access technology (E-UTRA), a radio access technology evolved from 4G (evolved E-UTRA), and a 5G radio access technology (new radio (NR)).

In this specification, an inter system supporting same or different communication networks may be basically divided into a terminal, a radio access network, and a plurality of core networks (CNs).

In this specification, a terminal may be an integrated terminal supporting all of a 4G radio access technology (E-UTRA), a radio access technology evolved from 4G (evolved E-UTRA), and a 5G radio access technology (new radio (NR)).

In this specification, a radio access network, a base station, and a network node may be used as the same meaning A base station may include a 5G base station (or new radio base station or gNB) using the 5G radio access technology (new radio (NR)), a 4G base station (LTE-eNB) using the 4G radio access technology (E-UTRA), and a base station (eLTE eNB) using the radio access technology evolved from 4G (evolved E-UTRA). Furthermore, the base station (eLTE eNB) may support the 4G radio access technology and the 5G radio access technology at the same time.

According to this specification, a wireless communication system, in which a terminal can perform communication with at least one cell associated with a first base station and at least one cell associated with a second base station, may support dual connectivity between the first base station and the second base station supporting heterogeneous or homogeneous radio access technology.

For example, the dual connectivity disclosed in this specification may include a case where both the first and second base stations relates to dual connectivity which concerns a 4G system or a case where the first base station relates to a 4G system and the second base station supports an NR system (E-UTRA-NR dual connectivity, EN-DC). Furthermore, even though the wireless communication system being disclosed in this specification relates to an EN-DC system, the system need not be limited thereto and can also embrace a multi-radio dual connectivity (MR-DC) system.

In an EN-DC system disclosed in this specification, a main base station may be used as the same meaning as a master base station, a MN, or a MeNB. A sub-base station may be used as the same meaning as a secondary base station, a SN, or a SgNB.

In the EN-DC system disclosed in this specification, a terminal may be connected to one eNB that operates as a master base station and one en-gNB that operates as a secondary base station.

The eNB may be connected to an EPC through an S1 interface and may be connected to an en-gNB through an X2 interface, and the en-gNB may be connected to the EPC through the S1. The en-gNB may be connected to the EPC through an X2-U interface or an S1-U interface.

In a homogeneous or heterogeneous network supporting small cell evolution, there are various requirements related to mobility robustness, signaling load being increased due to frequent handovers, improvement of throughput per user, system capacity, and the like.

The dual connectivity (DC) may imply control and data disconnection. For example, control signaling for mobility is provided through a macro cell at the same time as the time when a high-speed data connection is provided through a small cell.

Further, a disconnection between a downlink and an uplink and a connection between the downlink and the uplink are provided through other cells.

In the dual connectivity, the UE may be connected to one MN and one SN.

In addition, a DC in which a carrier aggregation (CA) is configured means an operation mode of the UE in an RRC connected state, and it is composed of a master cell group and a secondary cell group.

Here, "cell group" indicates a group of serving cells related to a master base station or a secondary base station in the dual connectivity.

A "master cell group (MCG)" is a group of serving cells related to the master base station, and it includes a primary cell (PCell) and selectively one or more secondary cells (SCells) in the dual connectivity.

A "secondary cell group (SCG)" indicates a group of serving cells related to the secondary base station including a primary SCell (PSCell) and selectively one or more SCells.

Here, the "cell" as described hereinafter should be discriminated from a "cell" as a general area covered by the base station. For example, the cell indicates a combination of resources of a downlink and selectively an uplink.

An MCG bearer is a radio protocol located in the master base station only to use only resources provided by the master base station in the dual connectivity, and a SCG bearer is a radio protocol located in the secondary base station only to use resources provided by the secondary base station in the dual connectivity.

FIG. 1 illustrates a general set up of a network, comprising a UE 300, which, prior to entering the idle state, is configured with Multi-RAT Dual Connectivity (MRDC) according to an embodiment of the disclosure.

Referring to FIG. 1, in such case part of the configuration is provided by a Master Node 100 (that amongst other things may configure a Master Cell Group comprising PCell and optionally some secondary cells, or SCells) and by a Secondary Node 200 (that similarly amongst other things may configure a Secondary Cell Group, or SCG). This is intended to represent a typical environment in which embodiments of the disclosure operate.

In order to better understand MDT, it is instructive to understand that there are two basic operational modes known in the prior art for the collection/reporting of MDT data: immediate and logged. In immediate mode, the UE has an active connection to the network (i.e., it is in connected mode). Here the UE reports certain parameters to the network as per its configuration. Such measurement reports are either provided at defined intervals (periodic measurements) or when specific conditions are met (event triggered measurements), again as configured by the network.

In logged mode, the UE is in an idle state or an inactive state (i.e., not connected) and stores or logs the measurements it is configured to make and transfers them to the network when a connected state is established. Again, the parameters and frequency of measurement are as defined by the network.

In logged mode, the UE is configured to record certain parameters, but is only required to report them when connected to the network, so as to preserve UE battery life. When connecting, the UE reports availability of the logged measurements and provides then when requested to do so by the network (i.e., the network explicitly retrieves the information). The logging may again either be done periodically or triggered by particular events.

Similar immediate and logged modes are relevant to embodiments of the disclosure, as described below.

Furthermore, as part of the 5G specifications, the concept of "early measurement" is defined. This relates to the situation where a UE is connecting or re-connecting to a network from an idle state or an inactive state, where it may be configured to perform certain measurements and report some or all of these back to the network to assist in the call setup or resumption procedure or for other reasons. As an example, early availability of measurement results may enable the network to quickly configure secondary cells on the frequencies for which such results are provided. The early measurements are also referred to as idle/inactive measurements.

In an embodiment of the disclosure, the early measurement signaling and procedures are adapted such that the UE is configured to provide location information in addition to any other parameters which it is ordinarily configured to provide. This is for the purpose of MDT.

Figure 2:
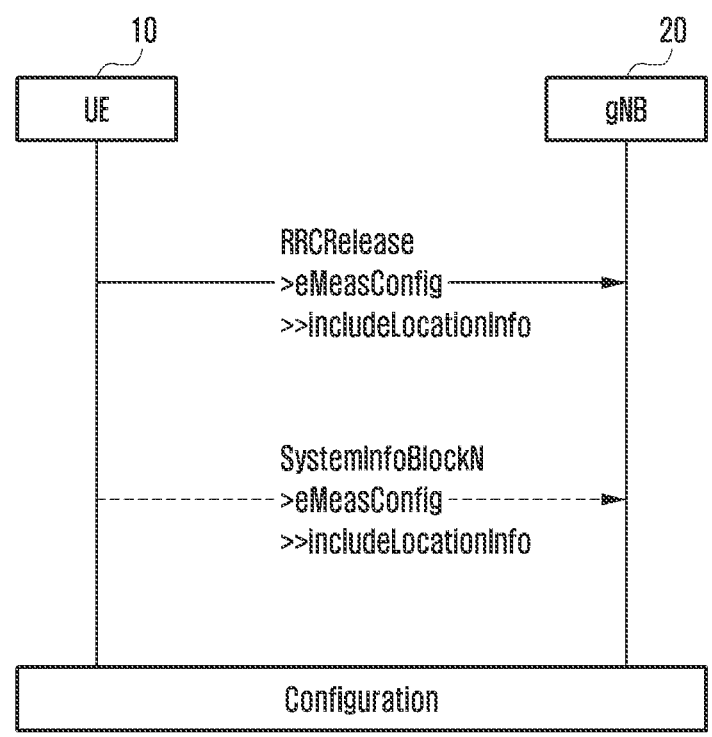
FIG. 2 illustrates message exchanges in connection with Minimisation of Drive Test (MDT) for early measurement (eMeas) according to an embodiment of the disclosure.
Figure 3:
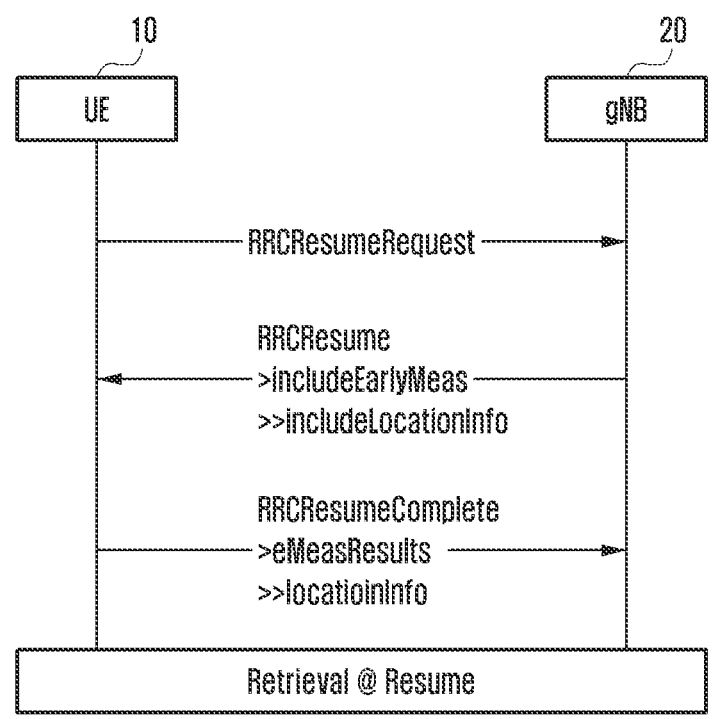
FIG. 3 illustrates message exchanges in connection with MDT for eMeas according to an embodiment of the disclosure.
Figure 4:
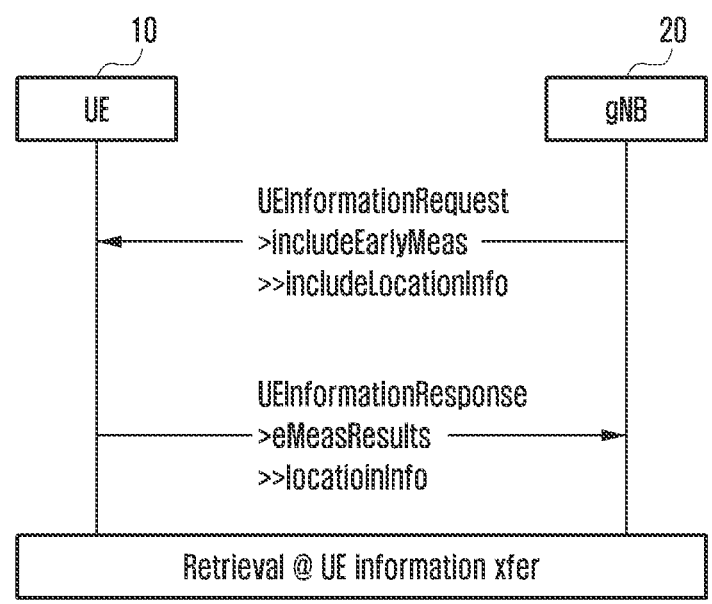
FIG. 4 illustrates message exchanges in connection with MDT for eMeas according to an embodiment of the disclosure.

FIGS. 2, 3, and 4 show various message exchanges between a UE 10 and a gNB 20 according to various embodiments of the disclosure. FIG. 2 relates to a configuration step according to an embodiment of the disclosure, FIG. 3 relates to a retrieval at resume operation according to an embodiment of the disclosure, and FIG. 4 relates to a retrieval at UE information transfer step according to an embodiment of the disclosure. In each case, the "IncludeLocationInfo" and "locationInfo" fields are newly introduced according to an embodiment of the disclosure.

Referring to FIGS. 2, 3, and 4, the UE is configured to provide early measurements including location information upon transition to connected mode. In order to do this, at configuration, a field is added by which the network can request the UE to provide detailed position information along with the early measurement (eMeas) results. The configuration field may be titled "includeLocationInfo".

The configuration can be set up such that is signaled upon eMeas configuration together with eMeas config provided by dedicated and/or broadcast signaling e.g., RRCRelease, SIBx, and/or upon retrieval by signaling together with a field by which the network requests the UE to provide eMeas results in RRCResume message and/or UEInformationRequest message.

In order to report the results to the network, a field may be added by which the UE can provide detailed position information (locationInfo) that may contain e.g., GPS position (defined by a shape, such as an ellipsoid or polygon), velocity and accuracy: RRCResumeComplete message and/or UEInformationResponse message.

To be clear, the provision of location information in this manner is not known in the prior art.

By configuring the UE to provide measurement parameters as well as location of the UE when the measurements were taken, the network is able to build a picture of coverage by virtue of measurements provided by multiple UEs just being used in a manner which supplements their normal mode of operation and which has minimal impact on their performance, particularly with regard to battery life. The network is thus able to learn of gaps in coverage, which can assist in network planning. This may require the logical reconfiguration of the network, or the physical addition of new network hardware to fill in areas of poor coverage.

Some or most UEs are provided with GPS capability which is able to provide a very fine degree of location granularity, ensuring that reported location information is accurate and thus more useful to the network. However, even if GPS functionality or any other satellite based positioning information is not available (e.g., disabled by the user), the UE is able to provide location information in the form of one or more cell IDs, based on a cell or neighboring cell's measured signal strength or various other methods.

Figure 5:
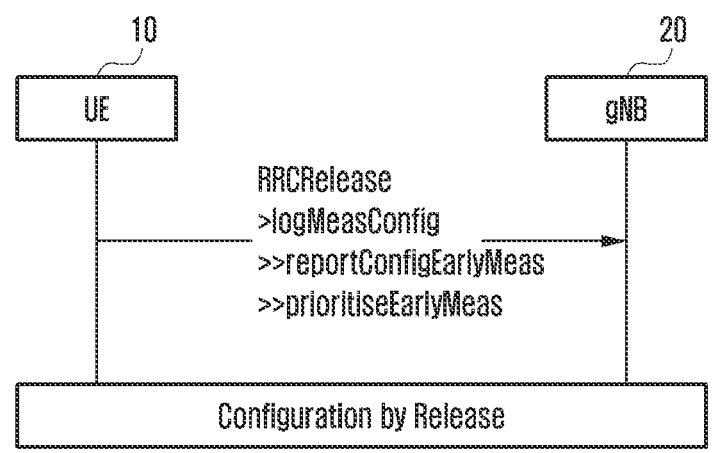
FIG. 5 illustrates message exchanges in connection with MDT for eMeas according to an embodiment of the disclosure.
Figure 6:
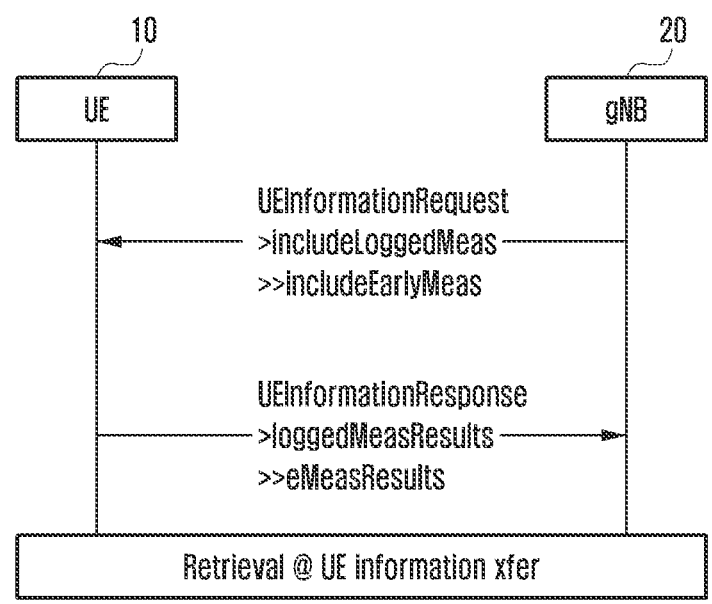
FIG. 6 illustrates message exchanges in connection with MDT for eMeas according to an embodiment of the disclosure.
Figure 7:
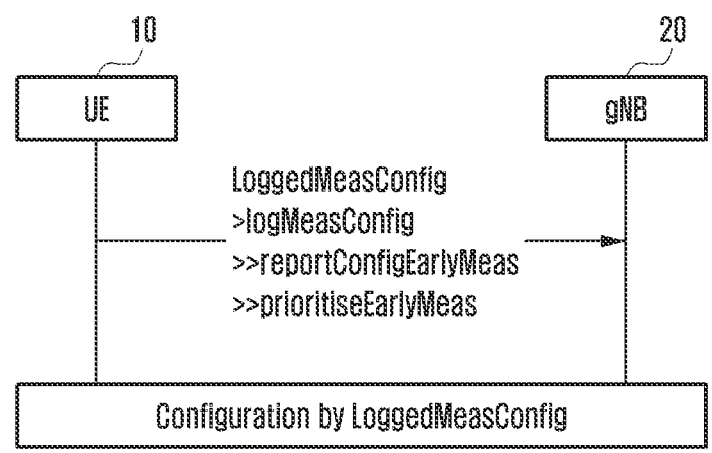
FIG. 7 illustrates message exchanges in connection with MDT for eMeas according to an embodiment of the disclosure.

FIGS. 5, 6, and 7 show various message exchanges between the UE 10 and gNB 20 according to various embodiments of the disclosure. These differ from FIGS. 2-4 in that they relate to the logged mode i.e., where the UE is not in a connected state, but is in an idle state. In this mode, when the UE is logging MDT results (regardless of whether periodic or event triggered), it also stores valid results available from performing early measurements. In this sense, a valid result is one that is not obsolete or outdated at the time of logging.

Referring to FIGS. 5, 6, and 7, when log MDT (i.e., logged MDT mode) is configured, the UE logs available measurements. For example, UEs do not take additional measurements merely for log MDT purposes as this would increase battery consumption. Additionally, when eMeas (i.e., early measurement) is configured, the UE has a greater number of measurements available that it can log (i.e., upload to the network).

There are various options associated with this configuration. For instance, rules may be defined which control what eMeas results UE should log, including whether to prioritize eMeas above other results. Further, within logged results a field may be provided to indicate if results are from eMeas, which may indicate a different performance or accuracy from non-eMeas results.

In order to implement this in the standards specification, a field may be provided by which the network can control the eMeas results.

For instance, a field (e.g., reportConfigEarlyMeas) may be provided to control which eMeas results the UE should log (i.e., which & what to include or omit). This field can relate to cell and/or beam results. This may relate to a limited number or only results above a defined threshold, which quantities to log (possibly none i.e., only identity). If the field is absent, no UE requirements apply regarding logging of early measurement results.

Further, a field (e.g., prioritizeEarlyMeas) may be provided indicating that the UE, when limiting what to log, should prioritize inclusion of at least certain eMeas results, such as when skipping logging of frequencies, cells/beams or certain results, the field indicates that UE should avoid skipping at least certain eMeas results.

Additional configuration fields as set out above may be signaled together with a field by which the network requests the UE to perform measurement logging, i.e., within: RRCRelease message and/or: LoggedMeasConfig message Alternatively, instead of using configuration parameters, as above, fixed rules may be defined.

At the report stage, existing fields known from the prior art may be re-used, but with some additions. For instance, fields may be provided (e.g., eMeasResults) for results only available for measurements performed for eMeas e.g., more beam results, other quantities. Further, a field may be defined (e.g., eMeas) indicating that a measurement result is from eMeas which may have a different performance than measurements from cell re-selection. The fields related to reporting results, as set out above, concern the UEInformationResponse message that may be changed accordingly.

In relation to both logged and immediate modes, the eMeas results may be handled separately from other MDT results measured by the UE. In this context, being treated separately may mean that the results are separated within the UE memory or within other UE variables. It may also refer to the signaling exchanged with the network i.e., one or more separate messages may be used to transfer the eMeas information to the network. This allows eMeas and MDT messages to be handled separately and to be independent of each other, allowing, for instance, different size limitations to be applied to the different messages.

In an embodiment of the disclosure, Dual Connectivity (DC) or Carrier Aggregation (CA) may be implemented, meaning that a UE may be connected to a Master Node (MN) while simultaneously communicating with a Secondary Node (SN). The SN is able to configure eMeas as required. For instance, the MN may have no or limited awareness of certain frequencies which are primarily controlled by the SN.

This arrangement allows for increased inter-node independence and/or allows certain SN details to be hidden from the MN. The MN may be an LTE node and/or controlling the LTE cells only while the SN is a 5G node and/or controls 5G cells. In general, it is preferable if the changes to the MN to interwork with such other RAT(s) are limited, so it need not have detailed knowledge of the foreign RAT. Independence may also make it easier to support inter-vendor operation (creating market opportunities for new vendors to enter market with 5G products)

When the SN configures the UE for eMeas, the eMeas configuration includes details of what the UE shall measure, such as Reference Signal (RS) configuration or including timing related information (as defined by SS/PBCH block measurement timing configuration or SMTC). In contrast, the loggedMeasurementConfig used in MDT typically does not include similar details of what the UE shall measure, since the UE typically logs available measurements.

Embodiments of the disclosure allow improved inter-node coordination of radio resources management (RRM) measurements. There are limits in the UE's capability regarding the RRM measurements it can perform. In case of DC, the UE capability has to be shared between the MN and the SN, both of which can configure such measurements. In the prior art, the MN allocates a number of frequencies for which the SN can configure measurements as well as the total number of measurements SN can configure (measurement identities). For example, the MN dictates the number and, if insufficient, the SN cannot request the MN to increase the allocated number.

However, the introduction of immediate MDT raises an issue of whether there is a need to change the inter-node coordination of the measurements, also considering that the measurements performed only for the purpose of MDT may be of a lower priority.

The following example examines the coordination of measurement frequencies. Assume the UE supports measurement on 8 NR frequencies. The MN configures measurements on 3 NR frequencies: Nf1 and Nf2 (for handover and load balancing), as well as Nf1 for immediate MDT (iMDT).

The MN indicates to the SN that it is allowed to configure NR measurements on up to 5 NR frequencies (the maximum of 8, minus the 3 configured by the MN). This raises an issue that if the SN requires more frequencies, the MN may accept this only if the SN will use this extra measurement for regular RRM, but MN may not accept this if the SN will use the extra measurement for iMDT.

Embodiments of the disclosure address the above issue by providing options for coordination of RRM measurements related to iMDT. These options include:

a) Introduce a re-negotiation process (i.e., an option for SN to request more capability) and specify that such request can only be used to request more for regular RRM (but not to request more for iMDT);

b) Introduce a re-negotiation process and that SN, when requesting more capability, indicates the purpose for which it is required;

c) Introduce separate coordination fields for immediate MDT (i.e., MN allocates separate value for SN, and the SN can request more for this separate value i.e., re-negotiate).

Options b) and c) above support the case where the MN might give up a frequency measured for iMDT so that SN can measure a frequency for iMDT.

Figure 8:
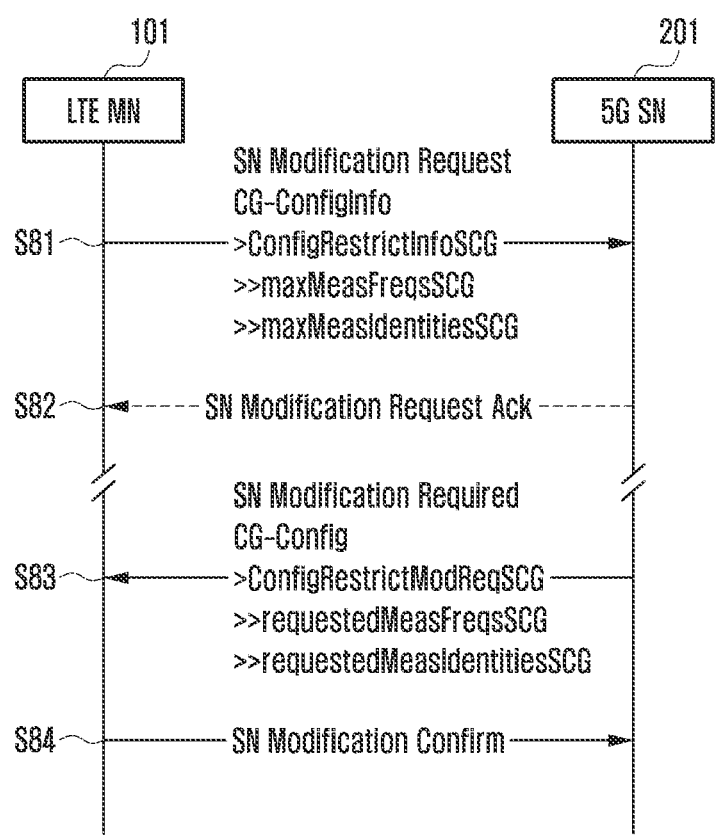
FIG. 8 illustrates a message exchange in connection with iMDT according to an embodiment of the disclosure.

FIG. 8 illustrates the signaling associated with case a) above and relates to the Eutra NR Dual Connectivity (EN-DC) case, otherwise known as Dual connectivity involving a 4G and 5G base station according to an embodiment of the disclosure.

Referring to FIG. 8, a MN is LTE (4G) 101 and a SN is 5G 201.

Parameters are added to RRC inter-node message CC-config by which SN can request additional frequencies or measurements (measurement identities). This can be done by extending ConfigRestrictModReq with the fields to request more #frequencies (requestedMeasFreqSCG) and for more #measurements (requestedMeasIdentitiesSCG), see FIG. 8. Here, messages S81, S82, and S84 are arranged as per the prior art, whereas message S83 includes the new fields requestedMeasFreqSCG and requestedMeasIdentitiesSCG referred to above.

In prior art networks (e.g., Release 15), the UE capabilities concerning measurements are limited, while the MN and SN can configure these measurements. In effect, the MN dictated to the SN how many frequencies and how many measurement (i.e., measurement identities) the SN was able to configure for measurement. This was the extent of inter-node coordination.

In an embodiment of the disclosure, the inter-node coordination is enhanced to reflect that MN and SN is able to configure additional measurements purely for iMDT purposes. Several approaches are herein presented, including the embodiment where a separate parameter is not provided by which the MN indicates how many frequencies or total measurements the SN is able to use specifically for iMDT, but instead provides a renegotiation option. This means that the MN does not dictate a number to the SN, but provides a means by which the SN can request more than previously allocated by the MN, indicated by the fields requestedMeasFreq(Identities)SCG.

In general for MRDC, there are two types of parameters associated with eMeas and MDT: those which the controlling node can set by itself; and those for which coordination is required. With regards to both eMeas and MDT, there are two options available:

MN decides and assigns the parameters (i.e., single/common for MN and SN configured operations) e.g., MN decides how long the UE shall perform MDT logging (logging duration) and the same value applies for the measurement logging configured by MN as well as for measurement logging configured by SN; or Each node sets parameters and they apply these to the operations configured by that node e.g., MN sets duration for logging configured by MN while SN sets duration for logging configured by SN For configuration parts involving many detailed parameters, independent control seems preferable (i.e., each node setting parameters for the items it controls). For other more general parameters, both of the above options are feasible.

In an alternative implementation, a single node controls (decides and assigns) the detailed configuration parameters for a particular frequency. Coordination may be required but this may involve merely determining which node is in control, rather than setting actual configuration parameters, which are then set by the node determined to be in control.

Coordination can be done without UE-specific inter-node signaling, by the Operation and Maintenance (O&M) function, or by inter-node signaling exchange when adding/modifying calls. The SN is assumed to control non-camping frequencies only, whereas the MN controls camping frequencies and those related to validity Area.

With regard to the configuration of eMeas in case of MRDC, and in particular, the respective roles for MN and SN different options may apply according to the general description outlined above. When it comes to the frequencies, one option is that SN sets the configuration parameters of SN controlled frequencies including the parameter cellsToMeasure, indicating which cells to measure while the MN sets configuration parameters of camping frequencies. Further, the MN can set the timer indicating how long the UE shall continue to perform the early measurements and the same value can apply for measurements configured by MN and SN (i.e., a single common value). This means that when moving the UE to idle/inactive state (i.e., releasing the connection via the Release message), the network sets a timer indicating for how long the UE shall continue to perform the early measurements).

Likewise, the MN can set the validityArea that the network can use to restrict the area in which the UE performs the early measurements. If configured, the UE stops early measurements when the UE is no longer camping on a cell that is part of the validityArea. Similar to the timer option set out above, the validity area can be common for MN and SN configured early measurements and set by the MN. As with the timer, the validity area can be included in the Release message.

Similarly, with regard to the configuration of logged MDT in case of MRDC, and in particular, the respective roles for the MN and the SN, different options may apply according to the general description outlined above. When it comes to the frequencies, one option is that the SN sets the detailed configuration parameters of SN-controlled frequencies while the MN provides such parameters for camping frequencies. Further, the MN can set the timer indicating how long the UE shall continue the logging, and the same value can apply for measurements configured by the MN and the SN (i.e., a single common value) Similar to the timer set out above, the MN can set the validity area that can be common for MN and SN-controlled frequencies, as it relates to camping frequencies.

Further details relating to Inter-node coordination will now be described.

As indicated above, the SN may provide some of the configuration for MDT or eMeas. In several cases, this configuration may be signaled to the UE via the MN. Likewise, the UE may provide the corresponding reports (measurement result) via the MN to the SN. In such a case, the MN can transparently forward the information from/to the SN. To ease such forwarding, the information concerned is carried within a container, typically realized by an octet string as shown below:

```
RRCRelease-vNxy-IEs ::=      SEQUENCE {
    measIdleConfig-SCG-rN    OCTET STRING (CONTAINING
RRCReconfiguration),
```

When the SN provides some configuration, the information can be signaled to the UE via the MN i.e., using SRB1. Alternatively, in some cases the configuration provided by the SN can be signaled to the UE directly using SRB3.

For eMeas, use of SRB1 is appropriate, as RRCRelease message is used. For logged MDT, use of SRB1 is the preferred option. However, a separate message may also be used.

Figure 10A:
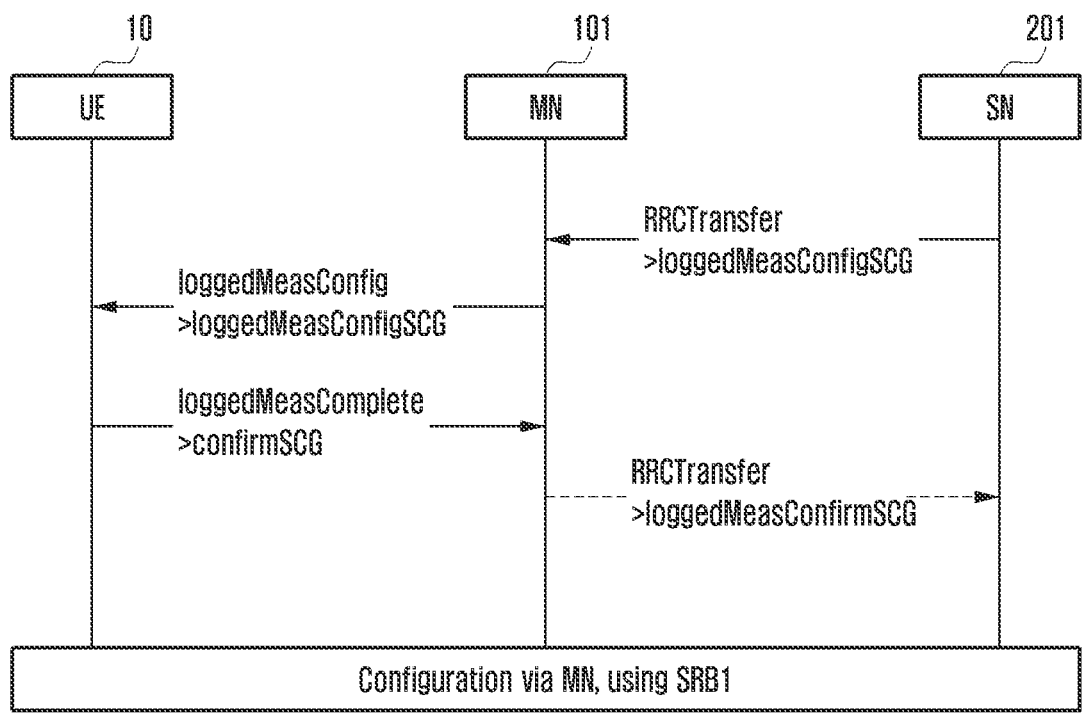
FIGS. 10A and 10B illustrate different configuration options according to various embodiments of the disclosure.
Figure 10B:
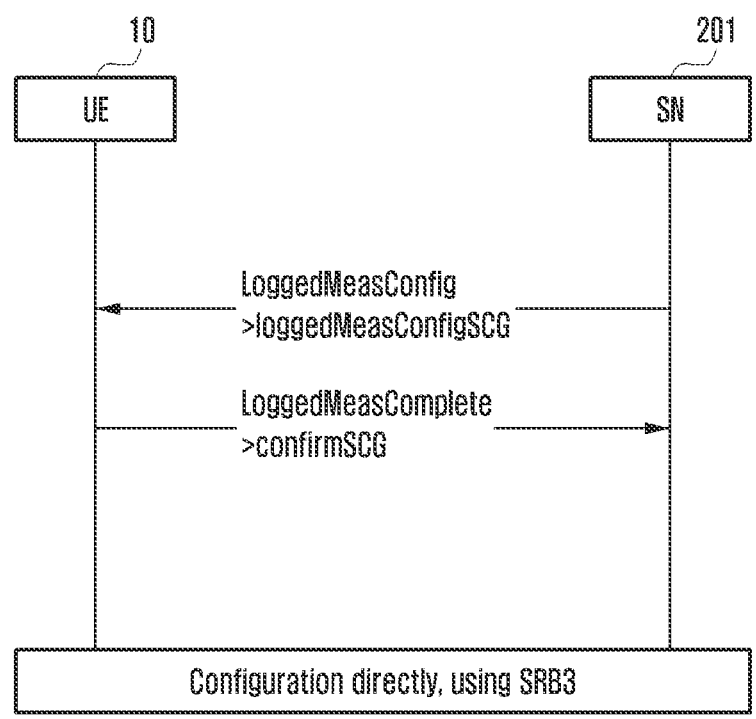

FIG. 10A illustrates the configuration via MN, using SRB1 according to an embodiment of the disclosure. FIG. 10B illustrates the configuration directly, using SRB3 according to an embodiment of the disclosure.

Similar techniques may be used by the SN to retrieve early measurement results from the UE.

Figure 11A:
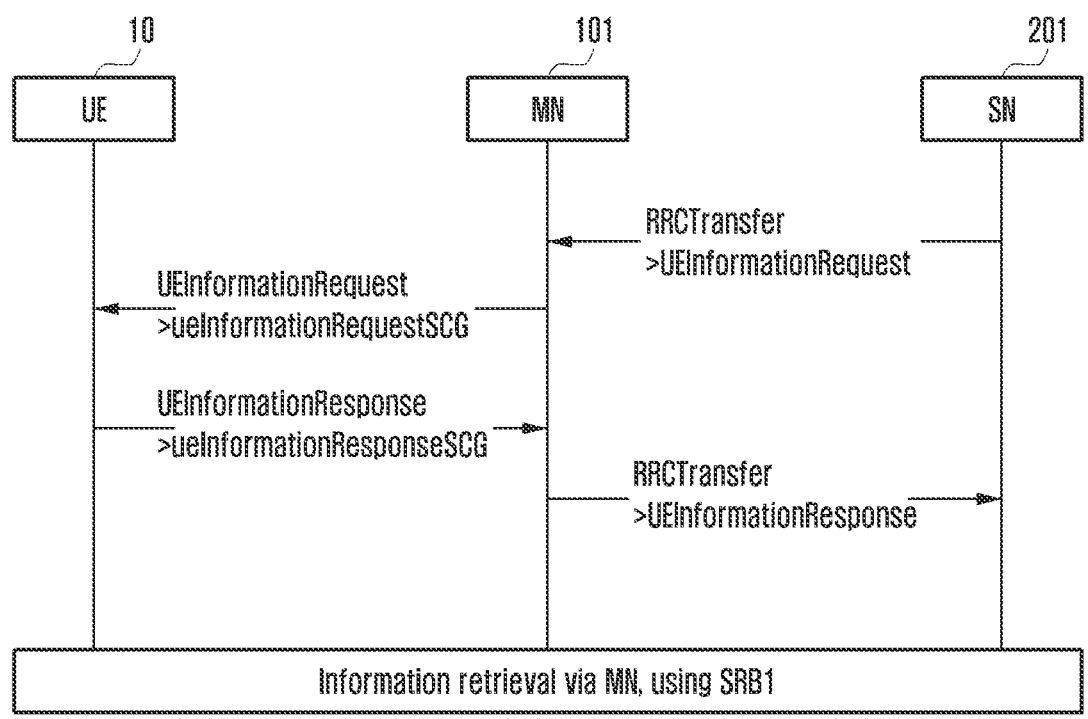
FIGS. 11A and 11B illustrate different configuration options according to various embodiments of the disclosure.
Figure 11B:
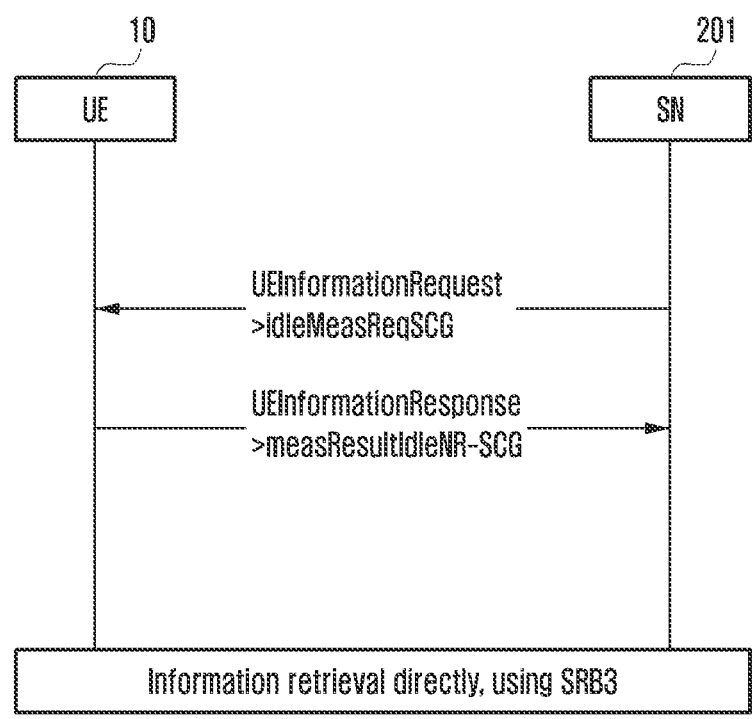

FIG. 11A illustrates the configuration via MN, using SRB1 according to an embodiment of the disclosure. FIG. 11B illustrates the configuration directly, using SRB3 according to an embodiment of the disclosure.

Figure 12:
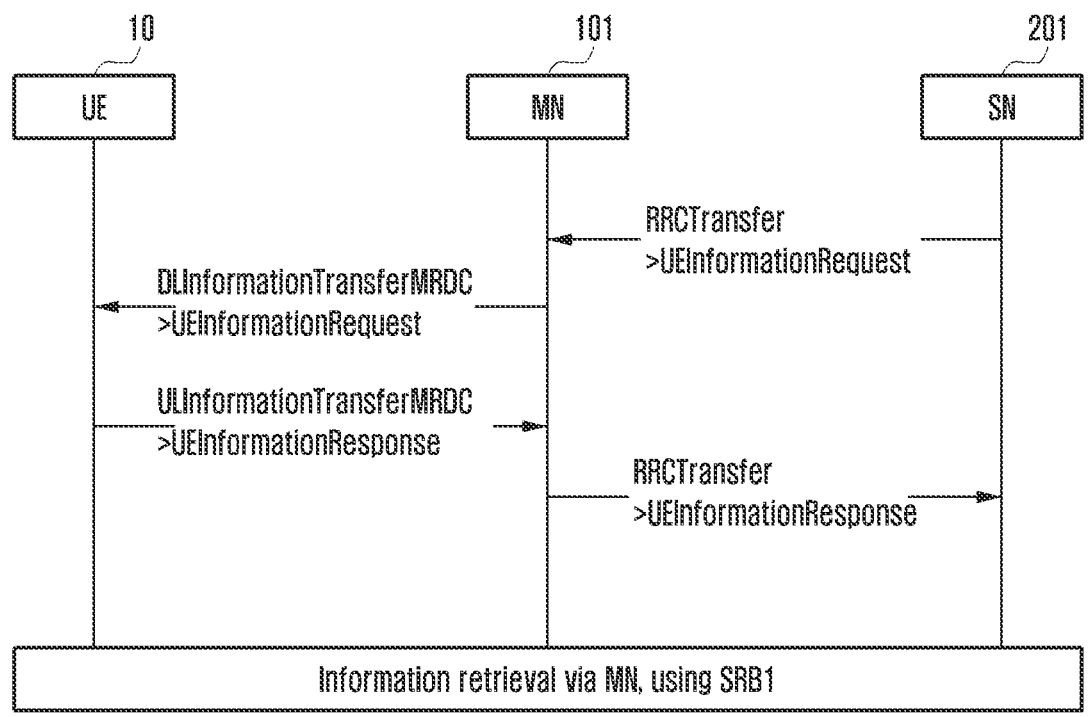
FIG. 12 illustrates information retrieval according to an embodiment of the disclosure.

FIG. 12 illustrates information retrieval according to an embodiment of disclosure.

It should be noted that the messages and fields shown in FIGS. 10A, 10B, 11A, and 11B are merely examples, and do not exclude other possibilities.

Referring to FIGS. 10A, 10B, 11A, 11B, and 12, for example, in the case where SRB1 is used, the SN could generate a complete message (e.g., LoggedMeasConfig, UEInformationRequest) that is transparently transferred from the MN to UE within the DLInformationTransfer-MRDC message. Likewise, the response message may be transferred from the UE to the MN within the ULInformationTransferMRDC message. Such an alternative is shown in FIG. 12 in connection with the retrieval of early measurement results.

For some cases (such as logged MDT, early measurements and transient MDT) the UE reports availability of results to the network which can subsequently initiate the UE Information procedure to retrieve the information. In case results are available corresponding to the configuration provided by SN, this can either be indicated by use of:
    One field common for MN and SN configured results
    Separate fields for MN and SN configured results
    Furthermore, for the subsequent retrieval of the results there are also different options:
    Only the MN can retrieve results from the UE
    Some results can be retrieved by MN and some results can be retrieved by SN
    For eMeas, MN retrieval is the preferred option as it can reduce transfer delays.

For logged MDT, MN initiated retrieval is the preferred option as it fits with the MN collecting all the results for uploading towards the appropriate entities within the Core Network (CN).

In general, there are different options regarding which message to use for setting the configuration, namely:
    Configure by the RRCRelease message
    Configure using a specific message (similar to Logged-MeasurementConfiguration in LTE)
    Configure using another general message e.g., by other-Config within RRCReconfiguration
    For eMeas, the RRCRelease message is suitable. For logged MDT, use of the RRCRelease is preferred, since this harmonizes the two cases.

Regarding the transfer of results to the network, there are different options:
    One common field for results of both MN and SN configured aspects
    Separate fields for results of MN and SN configured aspects
    For eMeas, the use of separate fields is preferred to facilitate transparent forwarding, noting that it is the. SN that processes the information and takes the corresponding actions.

For logged MDT, the same may apply, as the MN is not generally required to comprehend. However, forwarding to the SN may not apply in cases where the MN collects the results for uploading towards the appropriate entities within the CN.

Furthermore, the same signaling approach for eMDT and log MDT i.e., use RRCRelease message to configure both may be used. Alternatively, a different signaling approach for eMDT and log MDT may be used e.g., use different messages for each.

The functionality described herein may be optional or may require some message field to indicate whether Interoperability Testing has been performed in connection with UE capabilities. Regarding the UE capabilities for the MN and the SN configured functionality, two options are possible:
    A common field that the UE sets only when supporting both MN and SN configured functionality
    Separate fields by which the UE can specifically indicate whether MN and SN configured features are supported
    In case of MRDC, the UE can provide its capabilities by 3 different containers: one for LTE capabilities, one for MRDC capabilities and one for NR capabilities. The container containing the LTE capabilities only needs to be comprehended by the network node controlling LTE. Likewise, the container used to carry NR capabilities only needs to be comprehended by the network node controlling NR. The container carrying the MRDC capabilities needs to be comprehended by both types of network nodes.

There are different ways to carry the capabilities concerning the MDT and eMeas features discussed herein, noting that for features that the SN can configure, it needs to be aware of the associated UE capabilities. These different ways include:

Within the MRDC container

Within the capability container for MCG RAT and for the SCG RAT

The first option above is preferred when capability is common, while the second option is preferred in case separate fields for MN and SN-configured features are to be supported To support SN configuration for early measurements upon transition from RRC CONNECTED to RRC INACTIVE, parameters are added to RRC inter-node message CC-config by which the SN can configure early measurements for SN controlled frequencies. This is done by adding field earlyMeasConfigSCG (also referred to as measIdleConfig-SCG in the previous) and is shown in FIG. 9, where earlyMeasConfigSCG is added at the second message.

When the connection is subsequently resumed, the MN may forward the corresponding early measurement results to the SN. To enable this, a new field is introduced in CG-ConfigInfo earlyMeasResultSCG (other names may be used e.g., measResultIdleNR-SCG). This is shown at the third operation in FIG. 9. Within the same RRC inter-node message (CG-ConfigInfo), the MN may also transfer results of MN configured results concerning the SCG RAT, possibly using a different field. The SN can take the forwarded early measurements results into account when deciding the SCG configuration, as signaled in the CG-Config.

Figure 9:
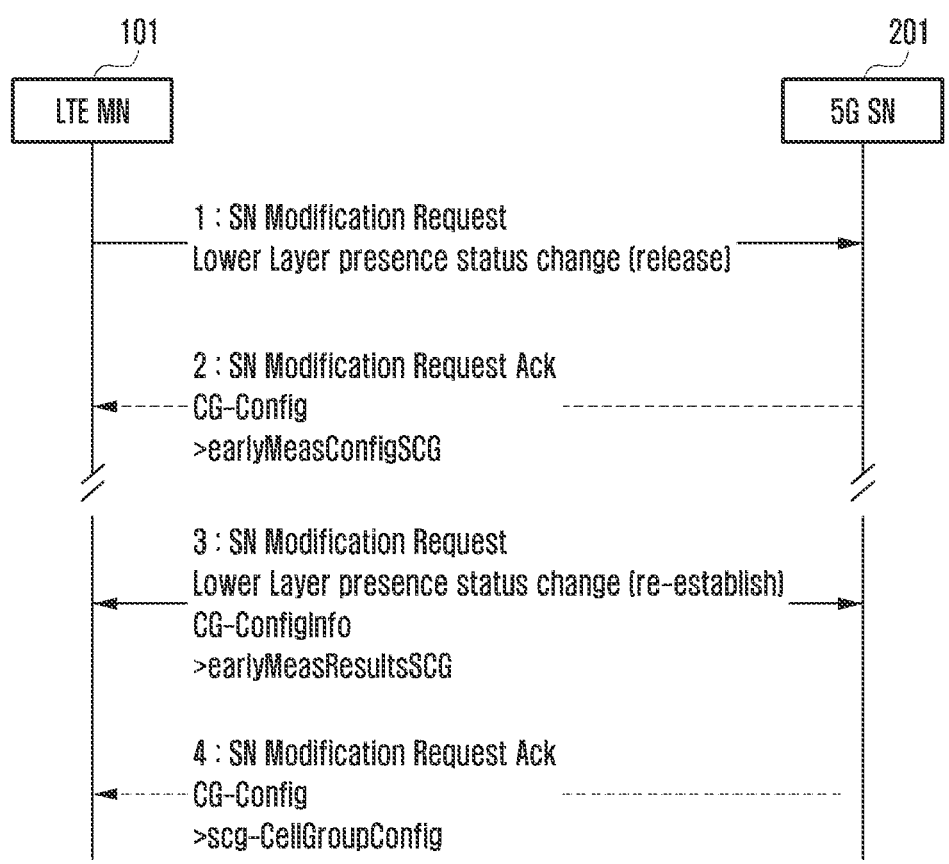
FIG. 9 illustrates a message exchange related to inter-node signaling upon transition to Inactive and subsequent resumption according to an embodiment of the disclosure.

FIG. 9 illustrates a particular scenario according to an embodiment of the disclosure. The same or similar changes to inter-node messages may apply for other scenarios.

Referring to FIG. 9, the following table provides an overview of further signaling aspects discussed above, illustrating some typical examples.

TABLE 1

| Case | Message for configuration | Message for results |
| --- | --- | --- |
| Logged MDT | SRB1 or SRB3: LoggedMeasurementConfiguration: If SN configuration would be used, it may be in one or more fields or by separate LoggedMeasurementConfiguration message (SRB3 option) | N/A (no need to forward to SN) |
| Immediate MDT | SRB1 or SRB3: RRCReconfiguration: SN configuration in existing field nr-SCG (state of art) | SN results carried by separate MeasurementResult message (state of art) |
| Early measurements | SRB1: RRCRelease: SN configuration in new field measIdleConfig -SCG | UEInformationResponse, RRCResumeComplete: SN results in new field measResultIdleNR-SCG |
| Transient MDT | Same as for early measurements | Same as for early measurements |

One further feature concerning logged MDT is that when the UE temporarily leaves the validity area it should not release the logged MDT Furthermore, upon change to another RAT, the UE may take the following actions:

Upon entering another (MCG/master) RAT, the UE suspends measurement logging (resumes upon return, unless meanwhile the timer has expired)

Upon entering SCG/secondary RAT, UE continues unchanged e.g., upon reselection to NR from inactive config covering (NG)EN-DC Upon entering SCG/secondary RAT, the UE suspends MN configured log MDT but continues SN configured log MDT When SN merely controls non-campable frequencies, option a) is regarded the primary option.

Figure 13:
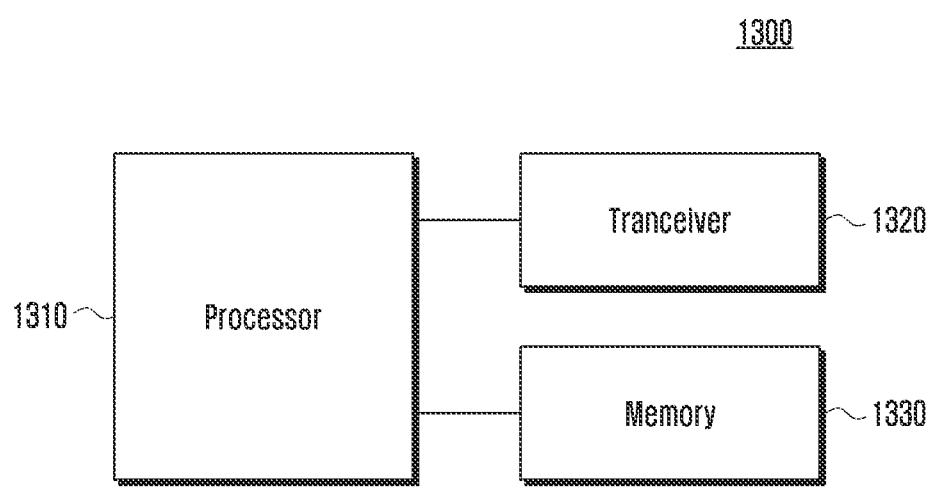
FIG. 13 is a block diagram of a user equipment (UE) in a wireless communication system according to an embodiment of the disclosure.

FIG. 13 is illustrates a block diagram of a user equipment (UE) in a wireless communication system according to an embodiment of the disclosure.

Referring to the FIG. 13, a UE 1300 may include a processor 1310, a transceiver 1320 and a memory 1330. However, all of the illustrated components are not essential. The UE 1300 may be implemented by more or less components than those illustrated in FIG. 13. In addition, the processor 1310 and the transceiver 1320 and the memory 1330 may be implemented as a single chip according to an embodiment of the disclosure.

The aforementioned components will now be described in detail.

The processor 1310 may include one or more processors or other processing devices that control the proposed function, process, and/or method. Operation of the UE 1300 may be implemented by the processor 1310.

In an embodiment of the disclosure, the processor 1310 may perform early MDT measurements and control the transceiver 1320 to transmit a measurement result to a base station.

In an embodiment of the disclosure, the processor 1310 may provide location information with the measurement result to a base station.

In an embodiment of the disclosure, the processor 1310 may log available measurements in the memory 1330 based on a configuration from a base station.

The transceiver 1320 may include a RF transmitter for up-converting and amplifying a transmitted signal, and a RF receiver for down-converting a frequency of a received signal. However, according to an embodiment of the disclosure, the transceiver 1320 may be implemented by more or less components than those illustrated in components.

The transceiver 1320 may be connected to the processor 1310 and transmit and/or receive a signal. The signal may include control information and data. In addition, the transceiver 1320 may receive the signal through a wireless channel and output the signal to the processor 1310. The transceiver 1320 may transmit a signal output from the processor 1310 through the wireless channel.

The memory 1330 may store control information or data included in a signal obtained by the UE 1300. The memory 1330 may be connected to the processor 1310 and store at least one instruction or a protocol or a parameter for the proposed function, process, and/or method. The memory 1330 may include read-only memory (ROM) and/or random access memory (RAM) and/or hard disk and/or CD-ROM and/or DVD and/or other storage devices.

Figure 14:
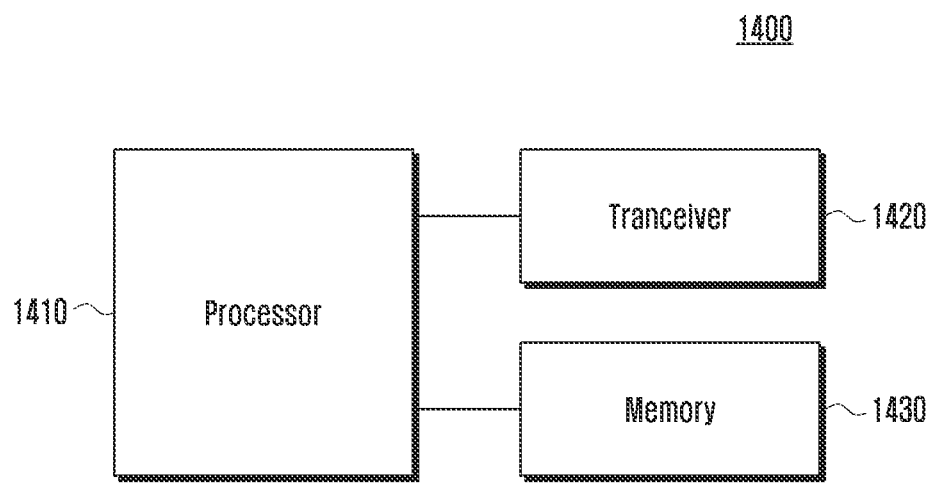
FIG. 14 is a block diagram of a base station in a wireless communication system according to an embodiment of the disclosure.

FIG. 14 is a block diagram of a base station in a wireless communication system according to an embodiment of the disclosure. In an embodiment of the disclosure, the base station includes a MN or a SN.

Referring to FIG. 14, a base station 1400 may include a processor 1410, a transceiver 1420 and a memory 1430. However, all of the illustrated components are not essential. The base station 1400 may be implemented by more or less components than those illustrated in FIG. 14. In addition, the processor 1410 and the transceiver 1420 and the memory 1430 may be implemented as a single chip according to an embodiment of the disclosure.

The aforementioned components will now be described in detail.

The processor 1410 may include one or more processors or other processing devices that control the proposed function, process, and/or method. Operation of the base station 1400 may be implemented by the processor 1410.

In an embodiment of the disclosure, the processor 1410 may control the transceiver 1420 to transmit a configuration for early MDT measurements to the UE.

In an embodiment of the disclosure, the processor 1410 may control the transceiver 1420 to receiver a measurement result for the early MDT measurements from the UE.

In an embodiment of the disclosure, the processor 1410 may determine whether reconfiguration of the network is needed based on the measurement result.

The transceiver 1420 may include a RF transmitter for up-converting and amplifying a transmitted signal, and a RF receiver for down-converting a frequency of a received signal. However, according to an embodiment of the disclosure, the transceiver 1420 may be implemented by more or less components than those illustrated in components.

The transceiver 1420 may be connected to the processor 1410 and transmit and/or receive a signal. The signal may include control information and data. In addition, the transceiver 1420 may receive the signal through a wireless channel and output the signal to the processor 610. The transceiver 1420 may transmit a signal output from the processor 1410 through the wireless channel The memory 1430 may store the control information or the data included in a signal obtained by the base station 1400. The memory 1430 may be connected to the processor 1410 and store at least one instruction or a protocol or a parameter for the proposed function, process, and/or method. The memory 1430 may include read-only memory (ROM) and/or random access memory (RAM) and/or hard disk and/or CD-ROM and/or DVD and/or other storage devices.

At least some of the example embodiments described herein may be constructed, partially or wholly, using dedicated special-purpose hardware. Terms, such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments of the disclosure, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. More particularly, the features of any one example embodiment may be combined with features of any other embodiment of the disclosure, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

In the above-described detailed embodiments of the disclosure, the elements included in the disclosure may be expressed in the singular or plural form depending on the proposed embodiment of the disclosure. However, the singular or plural expression has been selected suitably for a situation proposed for convenience of description, and the disclosure is not limited to the singular or plural elements. Although an element has been expressed in the plural form, it may be configured in the singular form. Although an element has been expressed in the singular form, it may be configured in the plural form. The embodiments described in this specification have been individually described, but two or more of the embodiments may be combined and practiced.

Although the detailed embodiments have been described in the detailed description of the disclosure, the disclosure may be modified in various ways without departing from the scope of the disclosure. Accordingly, the scope of the disclosure should not be limited to the above-described embodiments of the disclosure, but should be defined by not only the claims, but equivalents thereof.

The embodiments of the disclosure and the terms used in the embodiments are not intended to limit the technology described in this document to a specific embodiment of the disclosure, but should be construed as including various changes, equivalents and/or alternatives of a corresponding embodiment of the disclosure. Regarding the description of the drawings, similar reference numerals may be used in similar elements. An expression of the singular number may include an expression of the plural number unless clearly defined otherwise in the context. In this document, an expression, such as "A or B", "at least one of A or/and B", "A, B or C" or "at least one of A, B and/or C", may include all of possible combinations of listed items together. Expressions, such as "a first," "a second," "the first" and "the second", may modify corresponding elements regardless of the sequence and/or importance, and are used to only distinguish one element from the other element and do not limit corresponding elements. When it is described that one (e.g., first) element is "(operatively or communicatively) connected to" or "coupled with" the other (e.g., second) element, one element may be directly connected to the other element or may be connected to the other element through another element (e.g., third element).

The "module" used in the disclosure includes a unit configured with hardware, software or firmware, and may be interchangeably used with a term, such as logic, a logical block, a part or a circuit. The module may be an integrated part, a minimum unit to perform one or more functions, or a part thereof. For example, the module may be configured with an application-specific integrated circuit (ASIC).

The various embodiments of the disclosure may be implemented as machine (e.g., computer)-readable storage media (e.g., software (e.g., program) including instructions stored in an internal memory or external memory). A device is an apparatus capable of fetching instructions stored in the storage media and operating according to the fetched instructions, and may include a base station or UE according to various embodiments. If the instruction is executed by the processor (e.g., the processor 1310 of FIG. 13 or the processor 1410 of FIG. 14), a function corresponding to the instruction may be directly performed by the processor or may be performed using other elements under the control of the processor. The instruction may include code generated or executed by a compiler or interpreter.

The machine-readable storage media may be provided in the form of a non-transitory storage medium. In this case, the term "non-transitory" means that the storage media do not include a signal and is tangible, and is not limited to whether data is stored in the storage media semi-permanently or temporally.

The method according to various embodiments disclosed in the disclosure may be included in a computer program product and provided. The computer program product may be traded as a product between a seller and a purchaser. The computer program product may be online distributed in the form of device-readable storage media (e.g., compact disc read only memory (CD-ROM)) or through an app store (e.g., PlayStore). In the case of the online distribution, at least some of the computer program product may be at least temporarily stored or temporally generated in storage media, such as the memory of the server of a manufacturer, the server of an app store or a relay server.

Each of elements (e.g., module or program) according to various embodiments may be configured with a single entity or a plurality of entities. Some of the above-described sub-elements may be omitted other sub-elements may be further included in various embodiments. Alternatively or additionally, some elements (e.g., modules or programs) may be integrated into one entity, and may perform a function, performed by each corresponding element prior to the integration, identically or similarly.

Operations performed by a module, a program or other elements according to various embodiments may be executed sequentially, in parallel, repeatedly, or heuristically, or at least some operations may be executed in different order or may be omitted, or other operations may be added.

The methods of the embodiments illustrated in FIGS. 1 to 9, 10A, 10B, 11A, 11B, and 12 can include a combination of methods from more than one illustration.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, a logged measurement configuration message for minimization of drive test (MDT);
   identifying whether the logged measurement configuration message includes a field indicating for the terminal to log a measurement on an early measurement related frequency;
   performing measurement logging based on the identification, in case that the terminal is in a radio resource control (RRC) idle state or an RRC inactive state; and
   transmitting, to the base station, a message including measurement results based on the measurement logging, after the terminal is transitioned to an RRC connected state,
   wherein the measurement results include a measurement result for the MDT, in case that the field is absent in the logged measurement configuration message, and
   wherein the measurement results include a measurement result for the early measurement related frequency, in case that the field is present in the logged measurement configuration message.

2. The method of claim 1,
   wherein the measurement results further include the measurement result for the MDT, in case that the field is present in the logged measurement configuration message,
   wherein the logged measurement configuration message further includes information on a logging interval indicating a periodicity for logging the measurement, and
   wherein the message further includes a plurality of logged measurements for the logging interval and information on locations associated with the plurality of logged measurements.

3. The method of claim 1, further comprising:
   receiving, from the base station, a user equipment (UE) information request message for requesting the terminal to provide the measurement results,
   wherein the message is a UE information response message as a response to the UE information request message.

4. The method of claim 1, wherein information on the early measurement related frequency is provided to the terminal via a system information block (SIB) or an RRC release message.

5. The method of claim 1, wherein the logged measurement configuration message further includes information for prioritizing at least one measurement.

6. A method performed by a base station in a wireless communication system, the method comprising:
transmitting, to a terminal, a logged measurement configuration message for minimization of drive test (MDT); and
receiving, from the terminal, a message including measurement results for the terminal in a radio resource control (RRC) idle state or an RRC inactive state based on the logged measurement configuration message, after an RRC connection between the terminal and the base station,
wherein the measurement results include a measurement result for the MDT, in case that a field indicating for the terminal to log a measurement on an early measurement related frequency is absent in the logged measurement configuration message, and
wherein the measurement results include a measurement result for the early measurement related frequency, in case that the field is present in the logged measurement configuration message.

7. The method of claim 6,
wherein the measurement results further include the measurement result for the MDT, in case that the field is present in the logged measurement configuration message,
wherein the logged measurement configuration message further includes information on a logging interval indicating a periodicity for logging the measurement, and
wherein the message further includes a plurality of logged measurements for the logging interval and information on locations associated with the plurality of logged measurements.

8. The method of claim 6, further comprising:
transmitting, to the terminal, a user equipment (UE) information request message for requesting the terminal to provide the measurement results,
wherein the message is a UE information response message as a response to the UE information request message.

9. The method of claim 6, wherein information on the early measurement related frequency is provided to the terminal via a system information block (SIB) or an RRC release message.

10. The method of claim 6, wherein the logged measurement configuration message further includes information for prioritizing at least one measurement.

11. A terminal in a wireless communication system, the terminal comprising:
a transceiver; and
a controller configured to:
control the transceiver to receive, from a base station, a logged measurement configuration message for minimization of drive test (MDT),
identify whether the logged measurement configuration message includes a field indicating for the terminal to log a measurement on an early measurement related frequency,
perform measurement logging based on the identification, in case that the terminal is in a radio resource control (RRC) idle state or an RRC inactive state, and
control the transceiver to transmit, to the base station, a message including measurement results based on the measurement logging, after the terminal is transitioned to an RRC connected state,
wherein the measurement results include a measurement result for the MDT, in case that the field is absent in the logged measurement configuration message, and
wherein the measurement results include a measurement result for the early measurement related frequency, in case that the field is present in the logged measurement configuration message.

12. The terminal of claim 11,
wherein the measurement results further include the measurement result for the MDT, in case that the field is present in the logged measurement configuration message,
wherein the logged measurement configuration message further includes information on a logging interval indicating a periodicity for logging the measurement, and
wherein the message further includes a plurality of logged measurements for the logging interval and information on locations associated with the plurality of logged measurements.

13. The terminal of claim 11,
wherein the controller is further configured to control the transceiver to receive, from the base station, a user equipment (UE) information request message for requesting the terminal to provide the measurement results, and
wherein the message is a UE information response message as a response to the UE information request message.

14. The terminal of claim 11, wherein information on the early measurement related frequency is provided to the terminal via a system information block (SIB) or an RRC release message.

15. The terminal of claim 11, wherein the logged measurement configuration message further includes information for prioritizing at least one measurement.

16. A base station in a wireless communication system, the base station comprising:
a transceiver; and
a controller configured to:
control the transceiver to transmit, to a terminal, a logged measurement configuration message for minimization of drive test (MDT), and
control the transceiver to receive, from the terminal, a message including measurement results for the terminal in a radio resource control (RRC) idle state or an RRC inactive state based on the logged measurement configuration message, after an RRC connection between the terminal and the base station,
wherein the measurement results include a measurement result for the MDT, in case that a field indicating for the terminal to log a measurement on an early measurement related frequency is absent in the logged measurement configuration message, and
wherein the measurement results include a measurement result for the early measurement related frequency, in case that the field is present in the logged measurement configuration message.

17. The base station of claim 16,
wherein the measurement results further include the measurement result for the MDT, in case that the field is present in the logged measurement configuration message,
wherein the logged measurement configuration message further includes information on a logging interval indicating a periodicity for logging the measurement, and
wherein the message further includes a plurality of logged measurements for the logging interval and information on locations associated with the plurality of logged measurements.

18. The base station of claim 16,
wherein the controller is further configured to control the transceiver to transmit, to the terminal, a user equipment (UE) information request message for requesting the terminal to provide the measurement results, and
wherein the message is a UE information response message as a response to the UE information request message.

19. The base station of claim 16, wherein information on the early measurement related frequency is provided to the terminal via a system information block (SIB) or an RRC release message.

20. The base station of claim 16, wherein the logged measurement configuration message further includes information for prioritizing at least one measurement.

* * * * *